(12) United States Patent
Ono

(10) Patent No.: US 12,454,152 B2
(45) Date of Patent: Oct. 28, 2025

(54) PNEUMATIC TIRE

(71) Applicant: Toyo Tire Corporation, Itami (JP)

(72) Inventor: Kota Ono, Itami (JP)

(73) Assignee: Toyo Tire Corporation, Itami (JP)

( * ) Notice: Subject to any disclaimer, the term of this patent is extended or adjusted under 35 U.S.C. 154(b) by 10 days.

(21) Appl. No.: 18/229,255

(22) Filed: Aug. 2, 2023

(65) Prior Publication Data

US 2024/0149620 A1  May 9, 2024

(30) Foreign Application Priority Data

Nov. 8, 2022 (JP) ................................. 2022-178948

(51) Int. Cl.
*B60C 11/03* (2006.01)
*B60C 11/13* (2006.01)

(52) U.S. Cl.
CPC ...... *B60C 11/0304* (2013.01); *B60C 11/1323* (2013.01); *B60C 11/1392* (2013.01); *B60C 2011/0381* (2013.01); *B60C 2011/1338* (2013.01)

(58) Field of Classification Search
CPC ............ B60C 11/1323; B60C 11/0304; B60C 11/1392; B60C 2011/1338; B60C 2011/0381
See application file for complete search history.

(56) References Cited

U.S. PATENT DOCUMENTS

| 6,340,040 | B1 * | 1/2002 | Ikeda ................. B60C 11/0306 152/209.27 |
| 2008/0149242 | A1 * | 6/2008 | Oyama ................ B60C 11/047 152/209.19 |
| 2017/0326919 | A1 * | 11/2017 | Heinhaupt ............. B60C 11/11 |
| 2020/0086691 | A1 | 3/2020 | Cho et al. |

(Continued)

FOREIGN PATENT DOCUMENTS

| JP | 2003-154812 A | * | 5/2003 | |
| JP | 2006-111088 A | * | 4/2006 | ........... B60C 11/045 |

(Continued)

OTHER PUBLICATIONS

Machine translation for Japan 2003-154812 (Year: 2024).*

(Continued)

*Primary Examiner* — Steven D Maki
(74) *Attorney, Agent, or Firm* — John P. Kong

(57) ABSTRACT

A pneumatic tire capable of securing drainability of the main groove while improving rigidity of blocks and improving steering stability wherein an intermediate land area formed on an inner side of a shoulder main groove includes a plurality of intermediate blocks provided to be aligned in a tire circumferential direction, first intermediate lateral grooves provided between the intermediate blocks, and a plurality of first protrusions protruding from side walls of the intermediate blocks facing the shoulder main groove to the inside of the shoulder main groove. The first protrusion includes a first protrusion inclined surface connected to a (Continued)

ground contact surface of the intermediate block, a protruding height of which from a groove bottom of the shoulder main groove becomes smaller as going to a tip end, and at least part of a tip end of the first protrusion overlaps with a shoulder opening in a tire axial direction.

7 Claims, 7 Drawing Sheets

(56) References Cited

U.S. PATENT DOCUMENTS

| | | | |
|---|---|---|---|
| 2023/0202238 A1* | 6/2023 | Tada | B60C 11/0302 |
| | | | 152/209.8 |
| 2023/0202239 A1* | 6/2023 | Tada | B60C 11/0306 |
| | | | 152/209.1 |

FOREIGN PATENT DOCUMENTS

| | | | |
|---|---|---|---|
| JP | 2011-042219 A | * | 3/2011 |
| JP | 2012-020702 A | * | 2/2012 |
| JP | 2020-40656 A | | 3/2020 |

OTHER PUBLICATIONS

Machine translation for Japan 2006-111088 (Year: 2024).*
Machine translation for Japan 2011-042219 (Year: 2024).*
Machine translation for Japan 2012-020702 (Year: 2024).*

* cited by examiner

[FIG. 1]
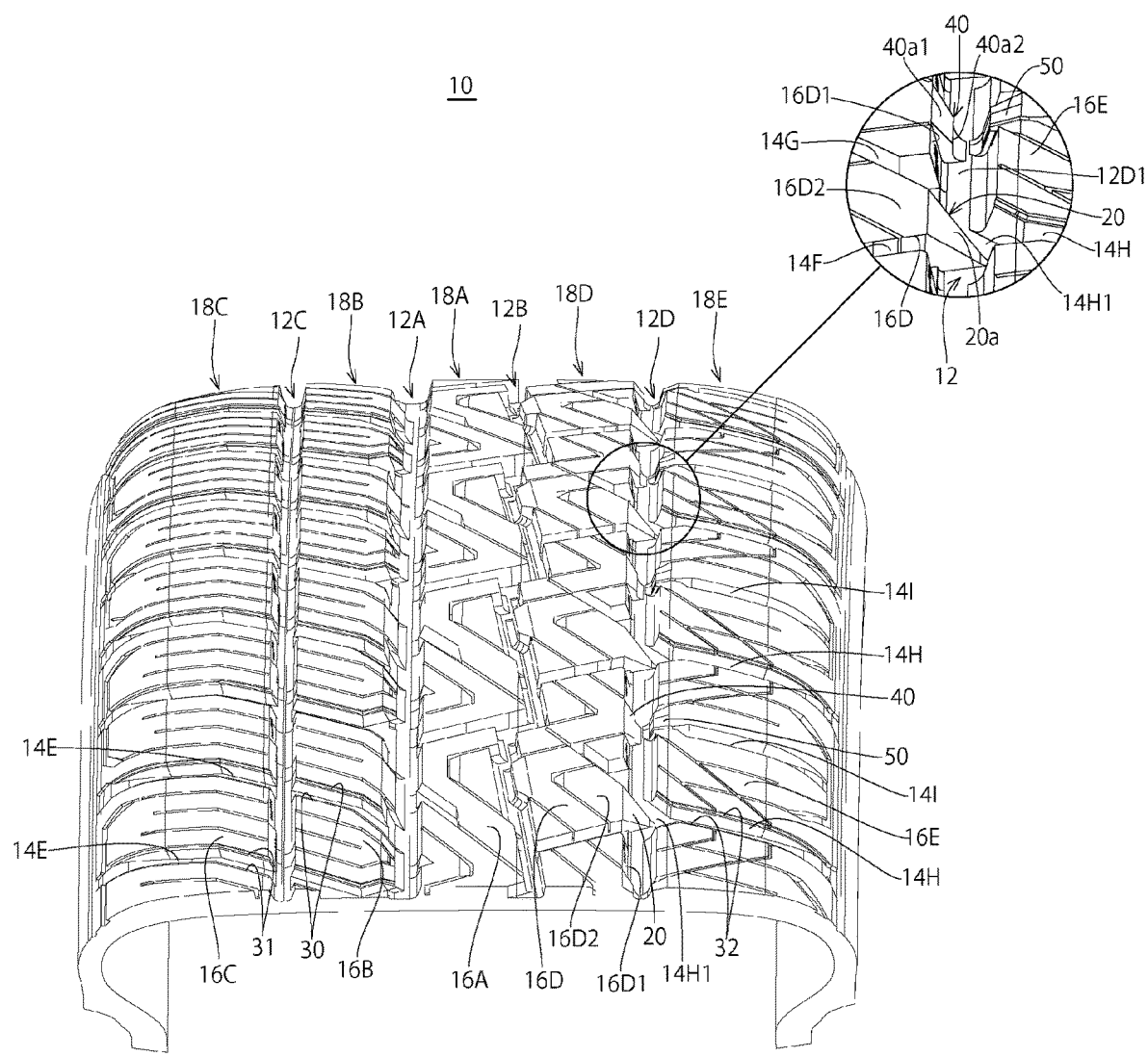

[FIG. 2]
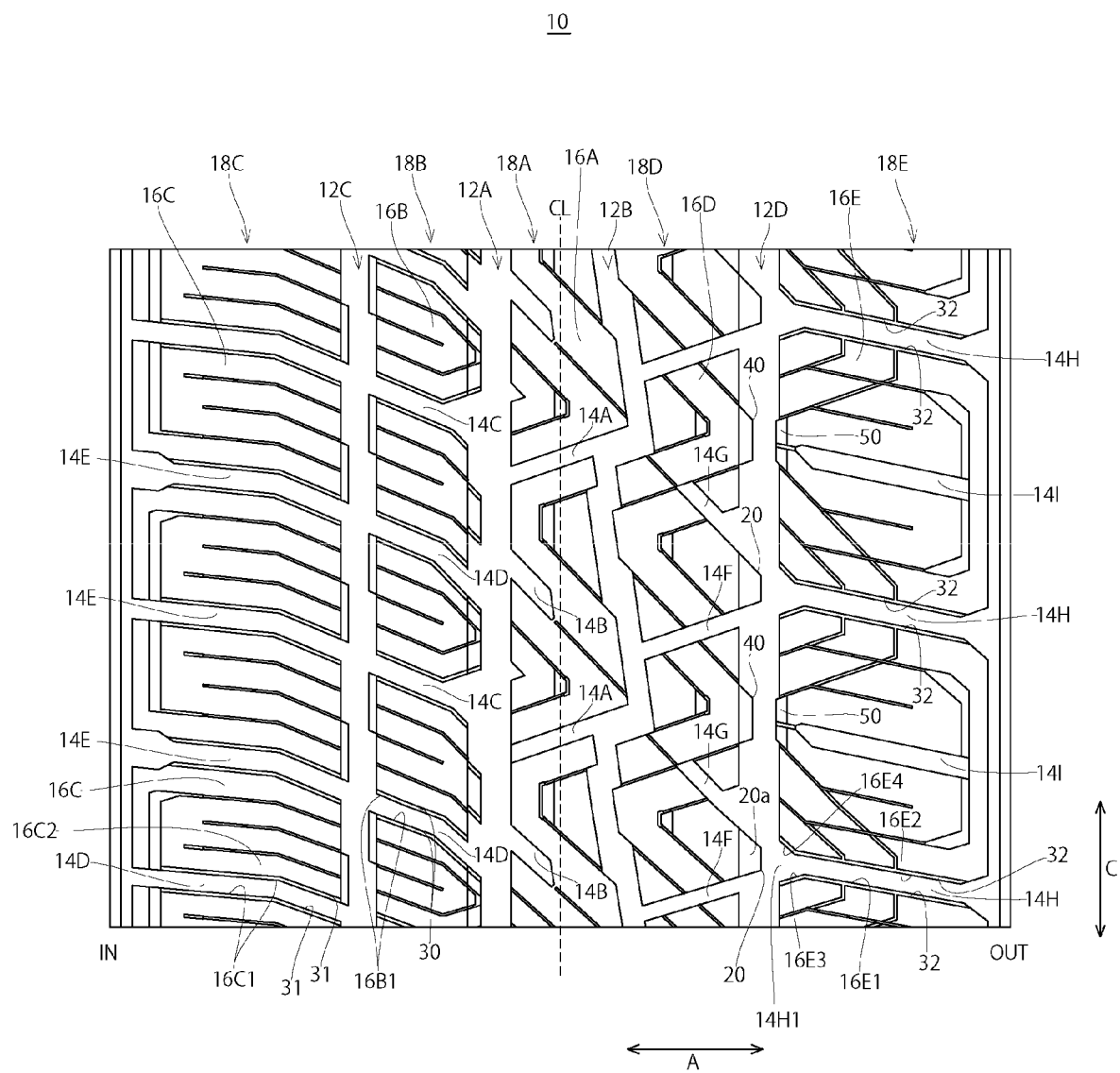

[FIG. 3]
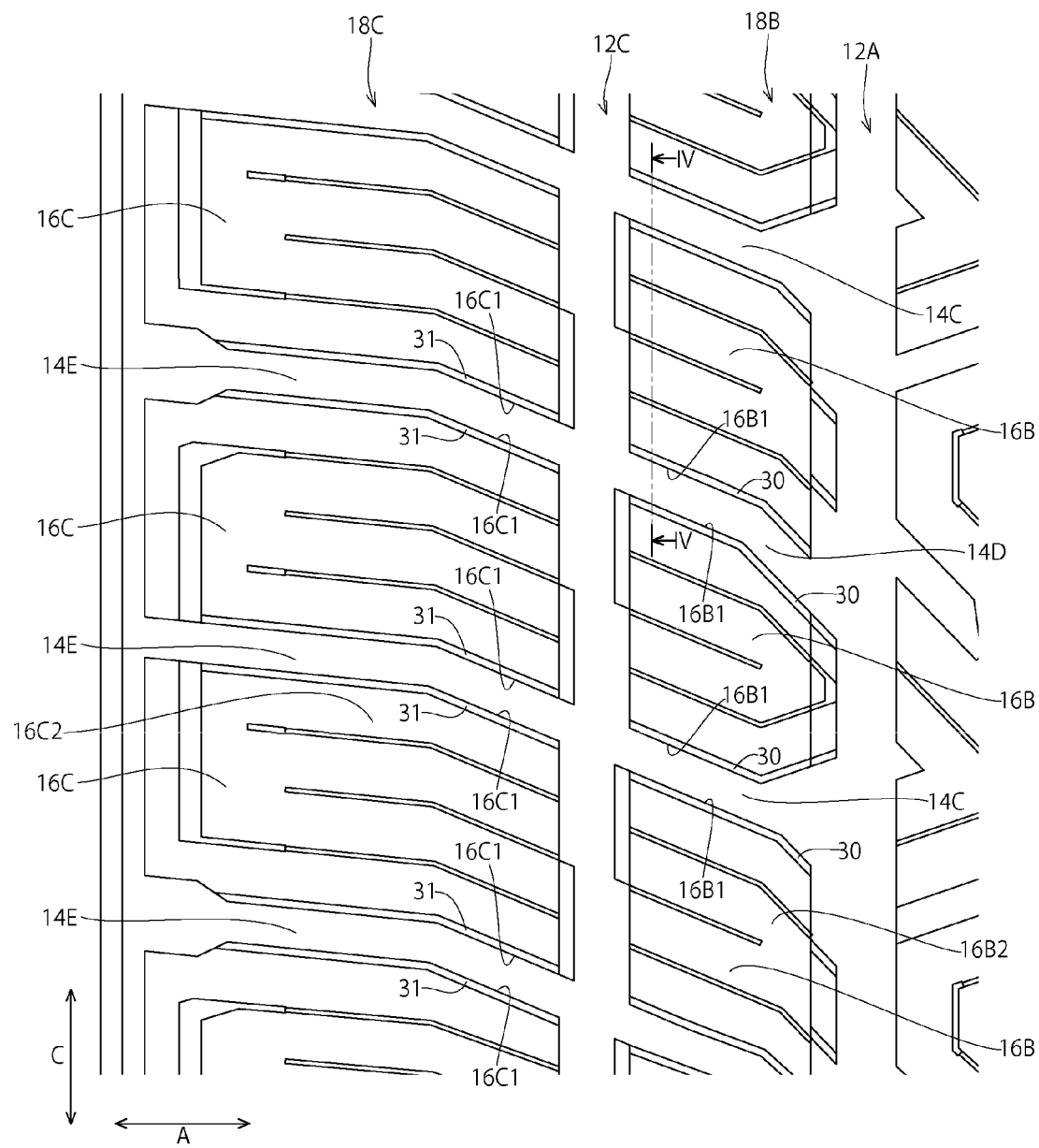

[FIG. 4]
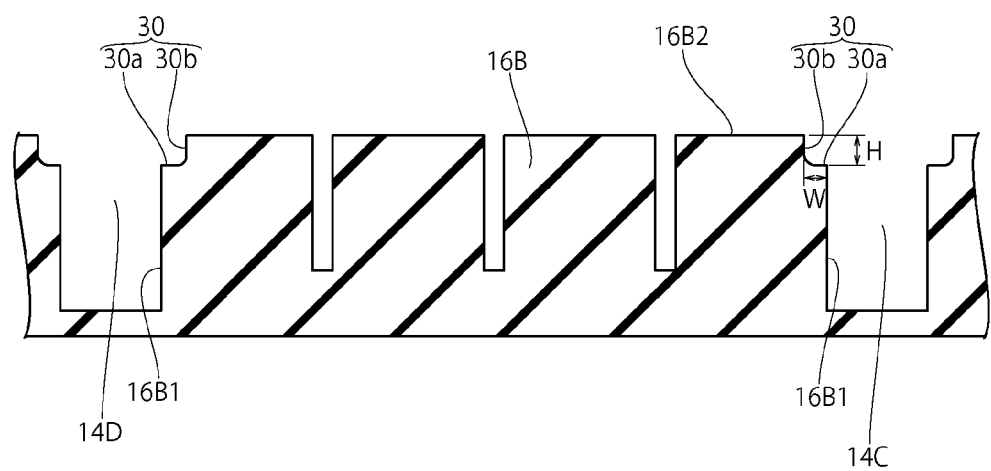

[FIG. 5]
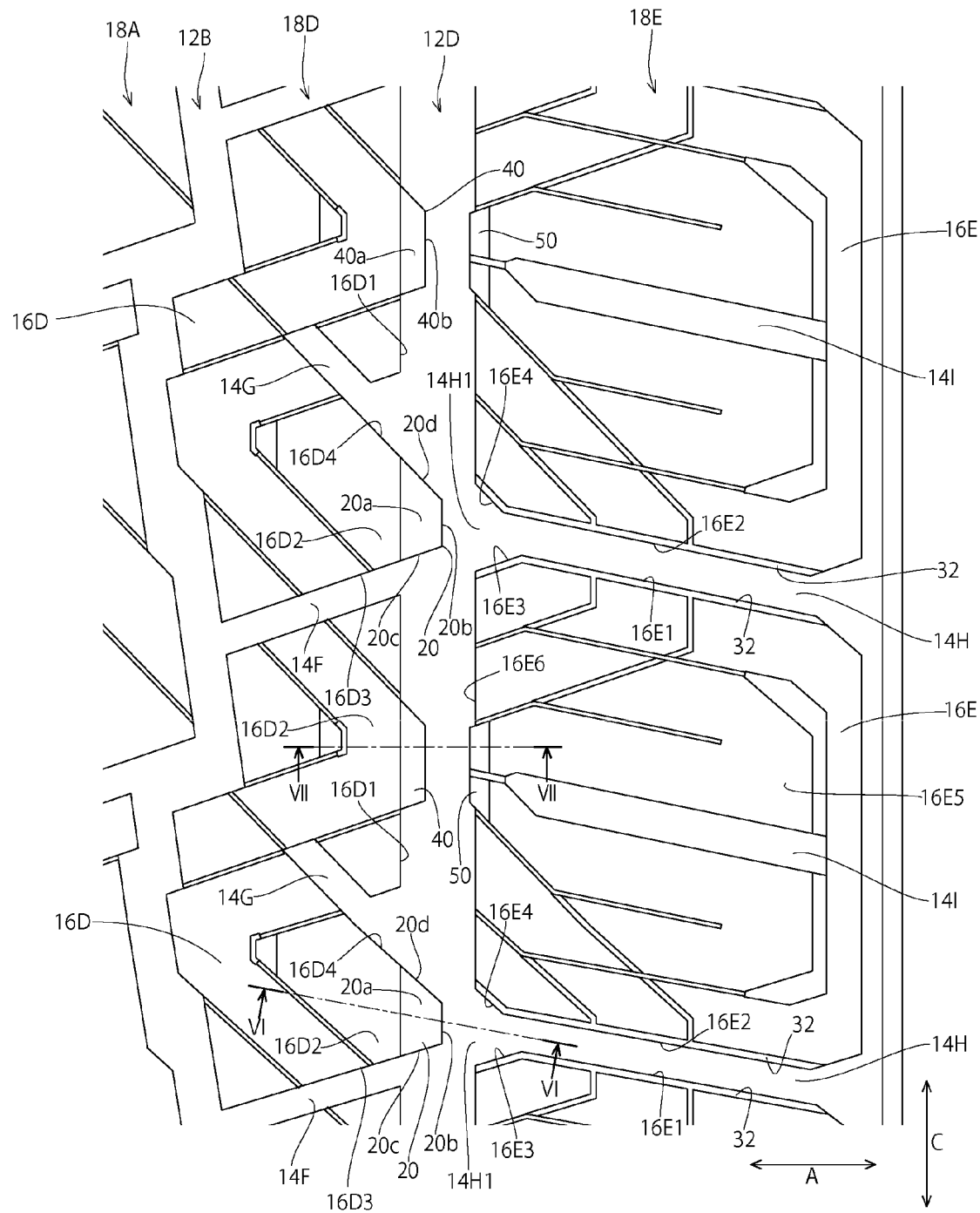

[FIG. 6]
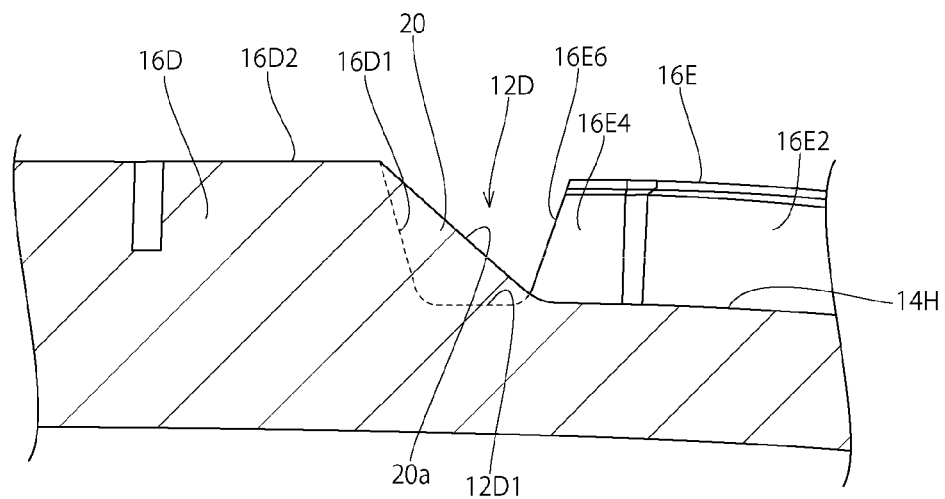
[FIG. 7]
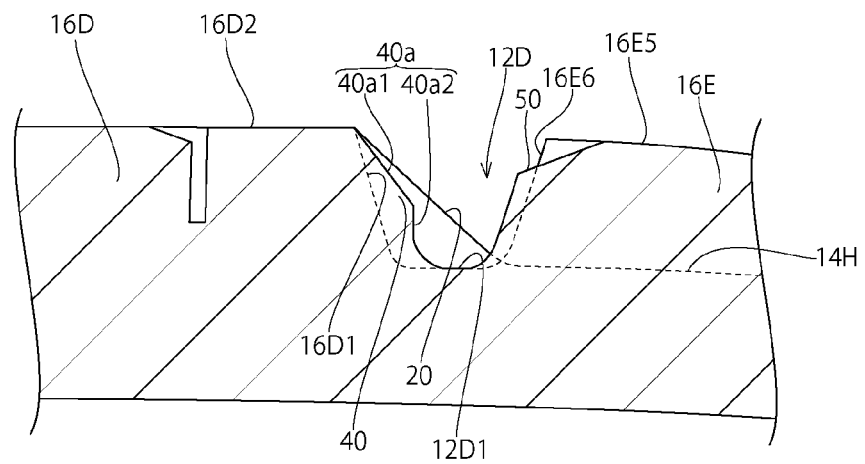

[FIG. 8]
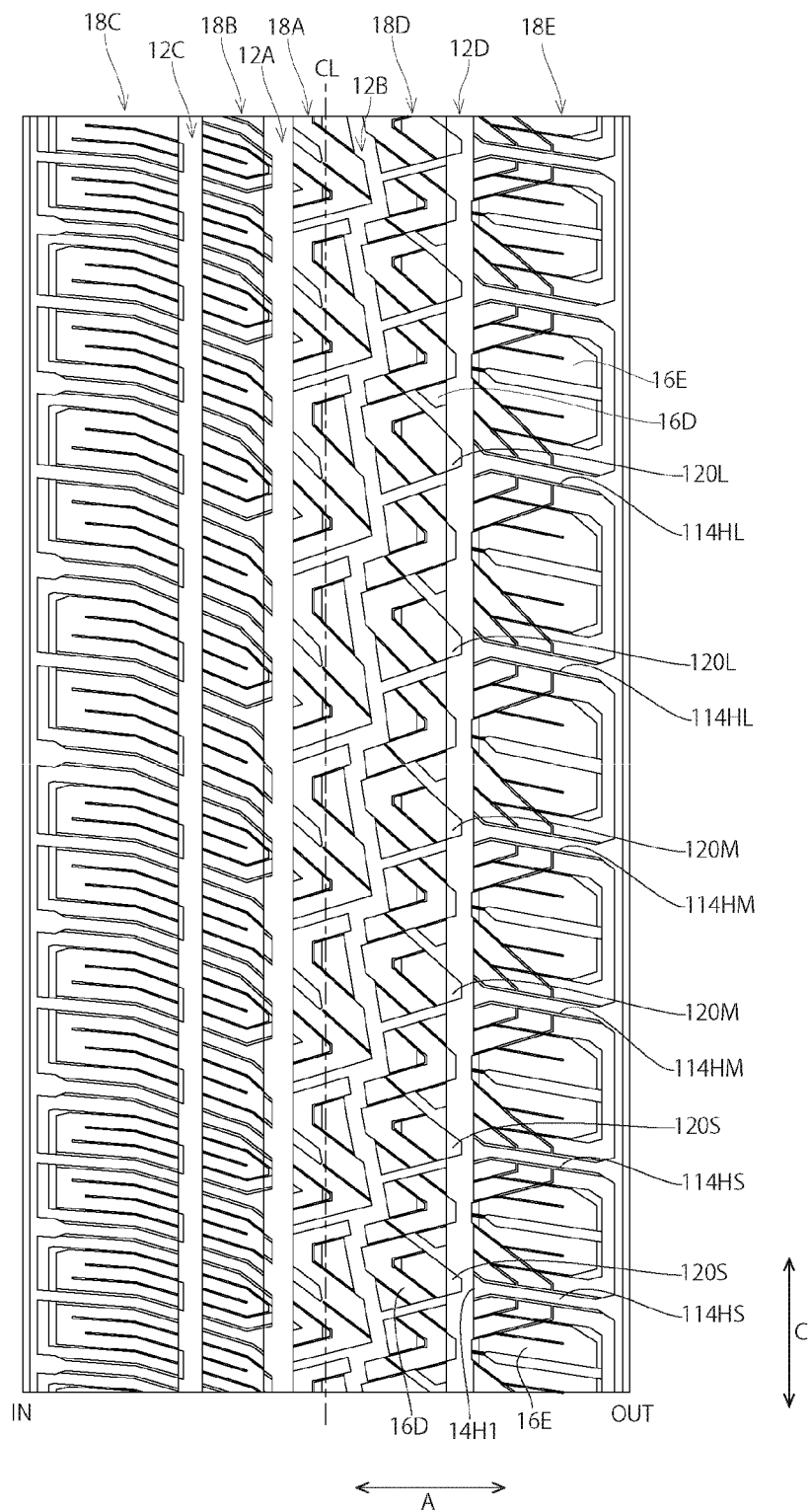

PNEUMATIC TIRE

BACKGROUND OF THE INVENTION

Field of the Invention

The present invention relates to a pneumatic tire.

Description of Related Art

There exists a pneumatic tire provided with blocks formed by a main groove extending in a tire circumferential direction and lateral grooves extending in a tire axial direction on a tread. In the tire provided with such blocks, rigidity at corner parts of the blocks tends to be reduced, which may reduce steering stability.

JP2020-40656A discloses that protrusions protruding to a main groove are provided on side walls of blocks facing the main groove to thereby reinforce the blocks in order to increase the rigidity of the blocks and improve steering stability.

When such protrusions are provided over a wide range or the protrusions are made to protrude largely from side walls of the blocks, the rigidity of the blocks can be improved on a large scale; however, drainability may be impaired due to reduction in groove volume of the main groove.

SUMMARY OF THE INVENTION

An object of the present invention is to provide a pneumatic tire capable of securing drainability of the main groove while improving the rigidity of blocks and improving steering stability.

A pneumatic tire includes, on a tread, a shoulder main groove extending in a tire circumferential direction, an intermediate land area formed on an inner side in a tire axial direction of the shoulder main groove, and a shoulder land area formed on an outer side in the tire axial direction of the shoulder main groove, in which the intermediate land area includes a plurality of intermediate blocks provided to be aligned in the tire circumferential direction, first intermediate lateral grooves provided between the intermediate blocks, and a plurality of first protrusions protruding from side walls of the intermediate blocks facing the shoulder main groove to the inside of the shoulder main groove, the shoulder land area includes a plurality of shoulder blocks provided to be aligned in the tire circumferential direction, and shoulder lateral grooves provided between the shoulder blocks, the shoulder lateral groove has a shoulder opening that opens to the shoulder main groove, the first protrusion includes a first protrusion inclined surface connected to a ground contact surface of the intermediate block, a protruding height of which from a groove bottom of the shoulder main groove becomes smaller as going to a tip end, and at least part of the tip end of the first protrusion overlaps with the shoulder opening in the tire axial direction.

Since the present invention has the above characteristics, it is possible to secure the groove volume of the main groove while improving rigidity of the blocks and improving steering stability.

BRIEF DESCRIPTION OF THE DRAWINGS

FIG. 1 is a perspective view showing a tread pattern of a pneumatic tire according to an embodiment;

FIG. 2 is a development view showing the tread pattern of the pneumatic tire according to an embodiment;

FIG. 3 is a main-part enlarged plan view of the tread pattern in FIG. 2;

FIG. 4 is a cross-sectional view taken along IV-IV line in FIG. 3;

FIG. 5 is a main-part enlarged plan view of the tread pattern in FIG. 2;

FIG. 6 is a cross-sectional view taken along VI-VI line in FIG. 5;

FIG. 7 is a cross-sectional view taken along VII-VII line in FIG. 5; and FIG. 8 is a development view showing a tread pattern of a pneumatic tire according to a modification example of the present invention.

DESCRIPTION OF EMBODIMENTS

Hereinafter, an embodiment of the present invention will be explained with reference to the drawings.

A tire according to the embodiment is a pneumatic tire, which is provided with right and left pair of bead parts and sidewalls, and a tread provided between both sidewalls so as to connect outer end portions in a radial direction of the right and left sidewalls to each other. An internal configuration of the tire is not particularly limited, and the tire is formed by including, for example, annular bead cores embedded in beads, a radial-structured carcass ply extending in a toroidal shape between the pair of beads, a belt, a tread rubber, and the like provided on an outer side in the tire radial direction of the carcass ply on the tread. In the embodiment, a general tire structure can be adopted except for a tread pattern.

Respective shapes and dimensions in this description are measured in a normal state with no load in which the tire is fitted to a normal rim and a normal internal pressure is filled unless otherwise noted. The normal rim corresponds to the "standard rim" in the JATMA standard, "Design Rim" in the TRA standard, or "Measuring Rim" in the ETRTO standard. The normal internal pressure corresponds to the "maximum air pressure" in the JATMA standard, the "maximum value" described in "TIRE LOAD LIMITS AT VARIOUS COLD INFLATION PRESSURES" in the TRA standard, or "INFLATION PRESSURE" in the ETRTO standard.

(1) Basic Structure of Tread 10

FIG. 1 is a perspective view showing part of a tread 10 of the tire according to an embodiment, and FIG. 2 is a partial development view of the tread 10 of the same tire. In the drawing, a symbol CL denotes a tire equatorial plane corresponding to the center in the tire axial direction. A symbol A denotes the tire axial direction (also referred to as a tire width direction). An inside in the tire axial direction A indicates the side closer to the tire equatorial plane CL. An outside in the tire axial direction A indicates the side farther from the tire equatorial plane CL. A symbol C denotes a tire circumferential direction which is a direction on a circumference centered at a tire rotation axis.

The tire shown in FIG. 1 and FIG. 2 is a tire in which front and back sides are designated when mounted to a vehicle. That is, a surface facing the outside and a surface facing the inside when mounted to the vehicle are designated. Accordingly, an indication for designating a mounting direction to the vehicle is provided on, for example, a sidewall surface of the tire. The tire is mounted to the vehicle so that a side denoted by a symbol OUT faces the outside (vehicle outside) in a vehicle mounted posture and a side denoted by a symbol IN faces the inside (vehicle inside) in the vehicle mounted posture in FIG. 2.

As shown in FIG. 1 and FIG. 2, four main grooves 12A, 12B, 12C, and 12D extending in the tire circumferential direction C, lateral grooves 14A, 14B, 14C, 14D, 14E, 14F, 14G, 14H, and 14I extending in the tire axial direction A, and blocks 16A, 16B, 16C, 16D, and 16E are provided on the surface of the tread 10.

Specifically, an inside center main groove 12A provided on the vehicle inside of the tire equatorial plane CL, an outside center main groove 12B provided on the vehicle outside of the tire equatorial plane CL, an inside shoulder main groove 12C provided on an outer side in the tire axial direction of the inside center main groove 12A, and an outside shoulder main groove 12D provided on an outer side in the tire axial direction of the outside center main groove 12B are provided on the tread 10.

In the embodiment, the inside center main groove 12A on the vehicle inside IN, the inside shoulder main groove 12C on the vehicle inside IN, and the outside shoulder main groove 12D on the vehicle outside OUT are straight main grooves extending in parallel to the tire circumferential direction C. The outside center main groove 12B on the vehicle outside OUT is a zigzag main groove extending in the tire circumferential direction C while bending in a zigzag shape.

Note that the inside center main groove 12A, the inside shoulder main groove 12C, and the outside shoulder main groove 12D may be zigzag-shaped main grooves, and the outside center main groove 12B may be a straight-shaped main groove. That is, the main grooves 12A, 12B, 12C, and 12D do not always have to be parallel to the tire circumferential direction C as long as the grooves extend in the tire circumferential direction C and may be grooves extending in the tire circumferential direction C while being inclined.

A center land area 18A is provided between the inside center main groove 12A and the outside main groove 12B. An inside intermediate land area 18B is provided on an inner side in the tire width direction of the inside shoulder main groove 12C (between the inside center main groove 12A and the inside shoulder main groove 12C). An inside shoulder land area 18C is provided on an outer side in the tire width direction of the inside shoulder main groove 12C (between the inside shoulder main groove 12C and a ground contact end). An outside intermediate land area 18D is provided on an inner side in the tire width direction of the outside shoulder main groove 12D (between the outside center main groove 12B and the outside shoulder main groove 12D). An outside shoulder land area 18E is provided on an outer side in the tire width direction of the outside shoulder main groove 12D (namely, between the outside shoulder main groove 12D and a ground contact end).

(2) Center Land Area 18A

As shown in FIG. 2, the center land area 18A provided between the inside center main groove 12A and the outside center main groove 12B has a plurality of first center lateral grooves 14A and a plurality of center blocks 16A. The first center lateral groove 14A is a groove extending while being inclined with respect to the tire axial direction A and opening to the inside center main groove 12A and the outside center main groove 12B.

One side of the center blocks 16A in the tire axial direction A is sectioned by the outside center main groove 12B extending in a zigzag shape in the tire circumferential direction C, the other side thereof is sectioned by the straight-shaped inside center main groove 12A extending in parallel to the tire circumferential direction C, and the center blocks 16A are divided in the tire circumferential direction C by the first center lateral grooves 14A.

The center blocks 16A are provided with second center lateral grooves 14B which are inclined in an opposite direction of the first center lateral grooves 14A. The second center lateral groove 14B is a groove in which one end opens to the inside center main groove 12A and the other end terminates in the center block 16A. The first center lateral grooves 14A and the second center lateral grooves 14B are alternately provided in the tire circumferential direction C. Note that the first center lateral groove 14A and the second center lateral groove 14B may be a straight-shaped groove, a curved groove, or a groove having a bent portion.

(3) Inside Intermediate Land Area 18B

As shown in FIG. 2 and FIG. 3, the inside intermediate land area 18B provided on the inner side in the tire width direction of the inside shoulder main groove 12C has a plurality of first inside intermediate lateral grooves 14C, a plurality of second inside intermediate lateral grooves 14D, and a plurality of inside intermediate blocks 16B.

The first inside intermediate lateral groove 14C and the second inside intermediate lateral groove 14D are grooves extending while being inclined with respect to the tire axial direction A and opening to the inside center main groove 12A and the inside shoulder main groove 12C. The first inside intermediate lateral grooves 14C and the second inside intermediate lateral grooves 14D are alternately provided in the tire circumferential direction C. The first inside intermediate lateral groove 14C is formed in a straight shape. The second inside intermediate lateral groove 14D is formed by a groove in which a portion closer to the inside shoulder main groove 12C is parallel to the first inside intermediate lateral groove 14C and a bent portion is formed at a center part in the tire axial direction. Note that the first inside intermediate lateral groove 14C and the second inside intermediate lateral groove 14D may be a straight-shaped groove, a curved groove, or a groove having a bent portion.

The inside intermediate blocks 16B are blocks in which both sides thereof in the tire axial direction A are sectioned by the straight-shaped inside center main groove 12A and the inside shoulder main groove 12C extending in parallel to the tire circumferential direction C, which are divided in the tire circumferential direction C by the first inside intermediate lateral grooves 14C and the second inside intermediate lateral grooves 14D.

As shown in FIG. 3 and FIG. 4, a step 30 extending in the tire axial direction A is formed on both end edges of the inside intermediate block 16B in the tire circumferential direction C.

(4) Inside Shoulder Land Area 18C

As shown in FIG. 2 and FIG. 3, the inside shoulder land area 18C provided on the outer side in the tire width direction of the inside shoulder main groove 12C has a plurality of inside shoulder lateral grooves 14E, and a plurality of inside shoulder blocks 16C.

The inside shoulder lateral groove 14E is a groove extending while being inclined with respect to the tire axial direction A and opening to the inside shoulder main groove 12C and the ground contact end. Openings of the inside shoulder lateral grooves 14E opening to the inside shoulder main groove 12C are formed on extended lines of the first inside intermediate lateral groove 14C and the second inside intermediate lateral groove 14D. The inside shoulder lateral groove 14E is formed by a groove having a bent portion. Note that the inside shoulder lateral groove 14E may be a straight-shaped groove or a curved groove.

The inside shoulder blocks 16C are blocks in which the inside thereof in the tire axial direction is sectioned by the straight-shaped inside shoulder main groove 12C extending in parallel to the tire circumferential direction C, which are divided in the tire circumferential direction C by the inside shoulder lateral grooves 14E.

A step 31 extending in the tire axial direction A is formed on both end edges of the inside shoulder block 16C in the tire circumferential direction C.

(5) Outside Intermediate Land Area 18D

As shown in FIG. 2 and FIG. 5, the outside intermediate land area 18D provided between the outside center main groove 12B and the outside shoulder main groove 12D has a plurality of first outside intermediate lateral grooves 14F and a plurality of outside intermediate blocks 16D.

The first outside intermediate lateral groove 14F is a straight-shaped groove extending while being inclined with respect to the tire axial direction A and opening to the outside center main groove 12B and the outside shoulder main groove 12D.

The outside intermediate blocks 16D are blocks in which one side thereof in the tire axial direction is sectioned by the outside center main groove 12B extending in a zigzag shape in the tire circumferential direction C and the other side thereof is sectioned by the straight-shaped outside shoulder main groove 12D extending in parallel to the tire circumferential direction C, which are divided in the tire circumferential direction C by the first outside intermediate lateral grooves 14F.

Each of the outside intermediate blocks 16D provided in the outside intermediate land area 18D has a wider area of a ground contact surface than each of the inside intermediate blocks 16B provided in the inside intermediate land area 18B. As shown in FIG. 2 and FIG. 5, when there are provided lateral grooves or grooves called sipes with a minute groove width (for example, 1 mm or less) which are closed at the time of contacting the ground in a normal load of the tire in the outside intermediate blocks 16D or the inside intermediate blocks 16B, the area of the ground contact surface indicates an area of a block surface not including the lateral grooves and sipes.

The outside intermediate blocks 16D are provided with second outside intermediate lateral grooves 14G which are inclined in an opposite direction of the first outside intermediate lateral grooves 14F. The second outside intermediate lateral groove 14G is a straight-shaped groove in which one end opens to the outside shoulder main groove 12D and the other end terminates in the outside intermediate block 16D. The second outside intermediate lateral grooves 14G and the first outside intermediate lateral grooves 14F are alternately provided in the tire circumferential direction C. Note that the first outside intermediate lateral groove 14F and the second outside intermediate lateral groove 14G may be a straight-shaped groove, a curved groove, or a groove having a bent portion.

Moreover, a first protrusion 20 and a second protrusion 40 protruding from a side wall 16D1 facing the outside shoulder main groove 12D to the inside of the outside shoulder main groove 12D are provided in the outside intermediate block 16D. The details of the first protrusion 20 and the second protrusion 40 will be described later.

In addition, on a portion of the second outside intermediate lateral groove 14G close to the outside center main groove 12B, a sipe may be provided so as to pierce into the outside center main groove 12B.

(6) First Protrusion 20 and Second Protrusion 40

Next, the first protrusion 20 and the second protrusion 40 will be explained mainly with reference to FIG. 5 to FIG. 7.

As shown in FIG. 5 to FIG. 7, the first protrusion 20 and the second protrusion 40 protrude to the inside of the outside shoulder main groove 12D from the side wall 16D1 of the outside intermediate block 16D facing the outside shoulder main groove 12D. A protruding amount of the second protrusion 40 from the side wall 16D1 of the outside intermediate block 16D to the outside shoulder main groove 12D is smaller than that of the first protrusion 20.

The first protrusion 20 is provided in an area sandwiched between the first outside intermediate lateral groove 14F and the second outside intermediate lateral groove 14G which come close to each other in the tire circumferential direction C as going to the outside shoulder main groove 12D. The second protrusion 40 is provided in an area sandwiched between the first outside intermediate lateral groove 14F and the second outside intermediate lateral groove 14G which are away from each other in the tire circumferential direction C as going to the outside shoulder main groove 12D. The outside intermediate block 16D is each provided with one first protrusion 20 and one second protrusion 40. The first protrusions 20 and the second protrusions 40 are alternately provided in the tire circumferential direction C.

The first protrusion 20 has a first protrusion inclined surface 20a which connects a ground contact surface 16D2 of the outside intermediate block 16D to a groove bottom 12D1 of the outside shoulder main groove 12D as shown in FIG. 5 and FIG. 6. The first protrusion inclined surface 20a is formed by a plane inclined so that a protruding height from the groove bottom 12D1 becomes smaller as going to a tip end 20b (namely, as coming close to the outside shoulder land area 18E). The first protrusion inclined surface 20a is smoothly connected to the groove bottom 12D1 with a curved surface near the groove bottom 12D1 of the outside shoulder main groove 12D.

The first protrusion 20 has a side wall 20c provided on one side in the tire circumferential direction C and a side wall 20d provided on the other side. One side wall 20c is placed on the same plane as a side wall 16D3 of the outside intermediate block 16D, which faces the first outside intermediate lateral groove 14F. The other side wall 20d is placed on the same plane as a side wall 16D4 of the outside intermediate block 16D, which faces the second outside intermediate side groove 14G. The side wall 20c and the side wall 20d are inclined so that an interval therebetween comes close to each other as going to the tip end 20b of the first protrusion 20. The first protrusion inclined surface 20a thus forms a trapezoidal shape in which a length in the tire circumferential direction C becomes shorter as going to the tip end 20b when seen from the tire radial direction as shown in FIG. 5.

The above first protrusion 20 is provided so that at least part of the tip end 20b overlaps with a portion 14H1 where the first outside shoulder lateral groove 14H opens to the outside shoulder main groove 12D (hereinafter, the portion may be referred to as a shoulder opening 14H1) in the tire axial direction A.

In the first protrusion 20, the tip end 20b is preferably arranged so that the center in the tire circumferential direction C of the tip end 20*b* overlaps with the center in the tire circumferential direction of the shoulder opening 14H1 in an extended direction of the first outside shoulder lateral groove 14H. Moreover, a length in the tire circumferential direction C of the tip end 20*b* of the first protrusion 20 is preferably shorter than a length in the tire circumferential direction C of the shoulder opening 14H1.

The second protrusion 40 has a second protrusion inclined surface 40*a* which connects the ground contact surface 16D2 of the outside intermediate block 16D to the groove bottom 12D1 of the outside shoulder main groove 12D as shown in FIG. 5 and FIG. 7. The second protrusion inclined surface 40*a* forms a trapezoidal shape in which a length in the tire circumferential direction C becomes shorter as going to a tip end 40*b* when seen from the tire radial direction as shown in FIG. 5. In the embodiment, a length in the tire circumferential direction C of the tip end 40*b* of the second protrusion 40 is longer than the length in the tire circumferential direction C of the tip end 20*b* of the first protrusion 20.

The second protrusion inclined surface 40*a* has a ground contact surface side inclined surface 40*a*1 connected to the ground contact surface 16D2 of the outside intermediate block 16D and a groove bottom side inclined surface 40*a*2 connected to a tip end side of the ground contact surface side inclined surface 40*a*1 as shown in FIG. 7. The ground contact surface side inclined surface 40*a*1 is formed by a plane inclined so that a protruding height from the groove bottom 12D1 becomes smaller as going to the tip end 40*b* of the second protrusion 40 (namely, as coming close to the outside shoulder land area 18E). The groove bottom side inclined surface 40*a*2 is formed by a plane provided approximately in parallel to the tire radial direction. The groove bottom side inclined surface 40*a*2 is smoothly connected to the groove bottom 12D1 with a curved surface near the groove bottom 12D1 of the outside shoulder main groove 12D.

(7) Outside Shoulder Land Area 18E

As shown in FIG. 2 and FIG. 5, the outside shoulder land area 18E provided on the outer side in the tire width direction of the outside shoulder main groove 12D has a plurality of first outside shoulder lateral grooves 14H, and a plurality of outside shoulder blocks 16E. The first outside shoulder lateral groove 14H is a straight-shaped groove extending while being inclined with respect to the tire axial direction A and opening to the outside shoulder main groove 12D and the ground contact end.

The outside shoulder blocks 16E are blocks in which the inside thereof in the tire axial direction A is sectioned by the straight-shaped outside shoulder main groove 12D extending in parallel to the tire circumferential direction C, which are divided in the tire circumferential direction C by the first outside shoulder lateral grooves 14H.

Each of the outside shoulder blocks 16E provided in the outside shoulder land area 18E has a wider area of a ground contact surface than each of the inside shoulder blocks 16C provided in the inside shoulder land area 18C. Note that, when there are provided lateral grooves or sipes in the outside shoulder blocks 16E or the inside shoulder blocks 16C as shown in FIG. 2, the area of the ground contact surface indicates an area of a block surface not including the lateral grooves and sipes.

The outside shoulder block 16E has a first side wall 16E1 and a second side wall 16E2 which face the first outside shoulder lateral grooves 14H.

On the outside shoulder main groove 12D side of the first side wall 16E1, a first shoulder inclined surface 16E3 which is inclined with respect to the first side wall 16E1 so that a groove width of the first outside shoulder lateral groove 14H is widened as coming close to the outside shoulder main groove 12D. The first shoulder inclined surface 16E3 is formed by a plane which is parallel to an extended direction of the first outside intermediate lateral groove 14F.

On the outside shoulder main groove 12D side of the second side wall 16E2, a second shoulder inclined surface 16E4 which is inclined with respect to the second side wall 16E2 so that the groove width of the first outside shoulder lateral groove 14H is widened as coming close to the outside shoulder main groove 12D. The second shoulder inclined surface 16E4 is formed by a plane which is parallel to an extended direction of the second outside intermediate lateral groove 14G.

The outside shoulder main groove 12D has the widest groove width at the shoulder opening 14H1 due to the first shoulder inclined surface 16E3 and the second shoulder inclined surface 16E4. In the embodiment, the shoulder opening 14H1 of the first outside shoulder lateral groove 14H is placed on the extension of the first outside intermediate lateral groove 14F, and the shoulder opening 14H1 of the first outside shoulder lateral groove 14H is placed on the extension of the second outside intermediate lateral groove 14G.

When the pneumatic tire is a tire in which a rotation direction is designated, it is preferable that the first shoulder inclined surface 16E3 that is wider than the second shoulder inclined surface 16E4 is provided on a kicking side of the outside shoulder block 16E (a rear side in the rotation direction), and the second shoulder inclined surface 16E4 narrower than the first shoulder inclined surface 16E3 is provided on a stepping side (a front side in the rotation direction).

A step 32 extending in the tire axial direction A is formed on both end edges of the outside shoulder block 16E in the tire circumferential direction C.

Moreover, the outside shoulder block 16E is provided with a chamfered portion 50 that is inclined from a ground contact surface 16E5 to a side wall 16E6 facing the outside shoulder main groove 12D, and a second outside shoulder lateral groove 14I extending in parallel to the first outside shoulder lateral groove 14H.

The chamfered portion 50 is provided at a position facing the second protrusion 40 provided in the outside intermediate block 16D with the outside shoulder main groove 12D interposed therebetween. The chamfered portion 50 may protrude from the side wall 16E6 facing the outside shoulder main groove 12D in the outside shoulder block 16E to the outside shoulder main groove 12D as shown in FIG. 1 and FIG. 7.

The second outside shoulder lateral groove 14I is a groove in which one end opens to the ground contact end and the other end terminates in the outside shoulder block 16E. The first outside shoulder lateral grooves 14H and the second outside shoulder lateral grooves 14I are alternately provided in the tire circumferential direction C.

Note that the first outside shoulder lateral groove 14H and the second outside shoulder lateral groove 14I may be a straight-shaped groove, a curved groove, or a groove having a bent portion.

Moreover, on portions of the second outside shoulder lateral grooves 14I close to the outside shoulder main groove 12D, cuts called sipes with a minute groove width (for example, 1 mm or less) which are closed at the time of contacting the ground in the normal load of the tire may be provided so as to pierce into the outside shoulder main groove 12D.

(8) Steps 30, 31, 32

In the inside intermediate block 16B and the outside intermediate block 16D, the step 30 is provided in the inside intermediate block 16B in which the area of the ground contact surface is smaller; however, the step is not provided on a circumferential edge of the outside intermediate block 16D in the embodiment.

Among the blocks 16A, 16B, 16C, 16D, and 16E provided on the tread 10, the steps 30, 31, and 32 are provided in the inside intermediate block 16B, the inside shoulder block 16C, and the outside shoulder block 16E in which sides thereof in the tire axial direction A are sectioned only by straight-shaped straight main grooves extending in parallel to the tire circumferential direction C; however, the step is not provided in the center block 16A and the outside intermediate block 16D in which one side thereof in the tire axial direction A is sectioned by the zigzag groove (outside center main groove 12B) extending in a zigzag shape in the tire circumferential direction C.

The step 30 provided in the inside intermediate block 16B is formed by a recess formed by a first surface 30a and a second surface 30b as shown in FIG. 4. The step 30 is provided on the entire edge formed by the side wall 16B1 of the inside intermediate block 16B facing the first inside intermediate lateral groove 14C or the second inside intermediate lateral groove 14D and the ground contact surface 16B2 of the inside intermediate block 16B.

The first surface 30a is a surface provided on an inner side in the tire radial direction than the ground contact surface 16B2 and facing the outside in the tire radial direction. The second surface 30b is a surface standing from the first surface 30a outward in the radial direction and connecting the first surface 30a and the ground contact surface 16B2.

The step 31 provided in the inside shoulder block 16C is formed by a recess formed by a first surface facing the outside in the tire radial direction and a second surface connecting the first surface and the ground contact surface 16C2 of the inside shoulder block 16C in the same manner as the step 30. The step 31 is provided on the entire edge formed by the side wall 16C1 of the inside shoulder block 16C facing the inside shoulder lateral groove 14E and the ground contact surface 16C2 of the inside shoulder block 16C.

The step 32 provided in the outside shoulder block 16E is formed by a recess formed by a first surface facing the outside in the tire radial direction and a second surface connecting the first surface and the ground contact surface 16E5 of the outside shoulder block 16E in the same manner as the steps 30 and 31. The step 32 is provided on the entire edge formed by the side wall 16E1 or 16E2 of the outside shoulder block 16E facing the first outside shoulder lateral groove 14H and the ground contact surface 16E5 of the outside shoulder block 16E.

The step 30 provided in the inside intermediate block 16B, the step 31 provided in the inside shoulder block 16C, and the step 32 provided in the outside shoulder block 16E have the same cross-sectional shape in the embodiment. For example, a depth of the steps 30, 31, and 32 (a length in the tire radial direction from the ground contact surfaces 16B2, 16C2, and 16E5 to the first surface 30a) H is preferably 5 to 50% of a depth of the lateral grooves 14C, 14D, 14E, and 14H, and can be, for example, 0.5 to 2.0 mm. A width W of the steps 30, 31, and 32 (a length from the side wall of the blocks where the steps 30, 31, and 32 are provided to the second surface 30b) can be set to be smaller than the depth H of the steps 30, 31, and 32, and can be, for example, 0.2 to 2.0 mm.

(9) Advantageous Effects

In the inside intermediate block 16B and the outside intermediate block 16D, the step 30 is provided in the inside intermediate block 16B in which the area of the ground contact surface is smaller; however, the step is not provided in the outside intermediate block 16D in which the area of the ground contact surface is larger in the embodiment. Therefore, it is possible to increase block rigidity of the inside intermediate block 16B where the area of the ground contact surface is small and the block rigidity tends to be lowered, and it is possible to suppress uneven wear generated between the inside intermediate block 16B and the outside intermediate block 16D.

Among the blocks 16A, 16B, 16C, 16D, and 16E provided on the tread 10, the steps 30, 31, and 32 are provided in the inside intermediate block 16B, the inside shoulder block 16C, and the outside shoulder block 16E in which sides thereof in the tire axial direction A are sectioned only by straight-shaped straight main grooves extending in parallel to the tire circumferential direction C in the embodiment. On the other hand, the step is not provided in the center block 16A and the outside intermediate block 16D in which one side in the tire axial direction A is sectioned by the outside center main groove 12B extending in a zigzag shape in the tire circumferential direction C. The block rigidity tends to be lowered in the blocks 16B, 16C, and 16E in which sides in the tire axial direction A are sectioned only by the straight-shaped straight main grooves as compared with the blocks 16A and 16D in which sides in the tire axial direction A are sectioned by the zigzag-shaped zigzag main groove; however, it is possible to increase the block rigidity of the blocks 16B, 16C, and 16E and to suppress uneven wear generated between the blocks 16B, 16C, 16E and the blocks 16A, 16D.

Furthermore, the first protrusions 20 protruding to the outside shoulder main groove 12D are provided in the outside intermediate blocks 16D in the embodiment; therefore, the rigidity of the outside intermediate blocks 16D can be improved and steering stability can be improved.

Since at least part of the tip end 20b of the first protrusion 20 overlaps with the shoulder opening 14H1 in the tire axial direction A in the embodiment, the groove width of the outside shoulder main groove 12D is not easily narrowed even when the first protrusion 20 protrudes to the main groove 12D, and drainage performance can be secured.

Additionally, the first protrusion 20 has the first protrusion inclined surface 20a that is inclined so that the protruding height from the groove bottom 12D1 gradually smaller as going to the tip end 20b from the ground contact surface 16D2 of the outside intermediate block 16D to the groove bottom 12D1 of the outside shoulder main groove 12D. Therefore, water entering the outside shoulder main groove 12D is easily led to the first outside shoulder lateral groove 14H by the first protrusion inclined surface 20a and drainage performance can be increased.

In the embodiment, the first protrusion inclined surface 20a of the first protrusion 20 forms the trapezoidal shape in which the length in the tire circumferential direction C becomes shorter as going to the tip end 20b when seen from the tire radial direction, and the rigidity of the first protrusion 20 can be increased as compared with a protrusion having a rectangular shape. Therefore, desired rigidity can be obtained in the outside intermediate block 16D even with the first protrusion 20 that is relatively small, and the block rigidity of the outside intermediate block 16D can be increased while securing drainage performance.

The outside shoulder block 16E is provided with the first shoulder inclined surface 16E3 and the second shoulder inclined surface 16E4 which are inclined so that the groove width of the first outside shoulder lateral groove 14H is widened in the first side wall 16E1 and the second side wall 16E2 facing the first outside shoulder lateral grooves 14H in the embodiment. Therefore, water entering the outside shoulder main groove 12D is easily drained to the first outside shoulder lateral groove 14H, and drainage performance can be increased.

Moreover, the first shoulder inclined surface 16E3 and the second shoulder inclined surface 16E4 are provided at block corner parts where uneven wear easily occurs in the outside shoulder block 16E; therefore, an angle at a corner part formed by the outside shoulder main groove 12D and the outside shoulder lateral groove 14 crossing each other becomes large, which suppresses wear in the corner part and suppressing uneven wear in the outside intermediate block 16D.

Furthermore, the first shoulder inclined surface 16E3 is formed by the plane which is parallel to the extended direction of the first outside intermediate lateral groove 14F and the second shoulder inclined surface 16E4 is formed by the plane which is parallel to the extended direction of the second outside intermediate lateral groove 14G; therefore, water flowing from the first outside intermediate lateral groove 14F or the second outside intermediate lateral groove 14G to the outside shoulder main groove 12D is guided by the first shoulder inclined surface 16E3 or the second shoulder inclined surface 16E4 and is easily drained to the first outside shoulder lateral groove 14H.

(10) Modification Examples

The above embodiment is exemplification, and the range of the invention is not limited to the above embodiment. Various modifications may occur in the above embodiment within a scope not departing from the gist of the invention. A plurality of modification examples will be explained below, and any one of the plurality of modification examples may be applied or two or more of the plurality of modification examples may be combined and applied to the embodiment.

Modification Example 1

The steps 31 and 32 are provided in the inside shoulder block 16C and the outside shoulder block 16E in the above embodiment; however, it is also preferable that the step is not provided in the outside shoulder block 16E in which the area of the ground contact surface is larger and the step is provided on at least part of a circumferential edge of the inside shoulder block 16C in which the area of the ground contact surface is smaller.

Modification Example 2

The steps 30, 31, and 32 are provided on end edges in the tire circumferential direction of the inside intermediate block 16B, the inside shoulder block 16C, and the outside shoulder block 16E, and the step is not provided on end edges in the tire axial direction of these blocks 16B, 16C, and 16E (namely, side walls of the inside intermediate block 16B facing the main grooves); however, steps may be provided only on end edges in the tire axial direction of the blocks 16B, 16C, and 16E or the step may be provided on the entire circumferential edge of the inside intermediate block 16B.

Modification Example 3

The modification example 3 of the above embodiment will be explained with reference to FIG. 8. In the drawings showing the modification example, the same symbols as the above embodiment are given to components similar to the above embodiment.

In the example of FIG. 8, there exist a large protrusion 120L in which the area of the first protrusion inclined surface 20a is large, a small protrusion 120S in which the area of the first protrusion inclined surface 20a is smaller than the large protrusion 120L, and a middle protrusion 120M in which the area of the first protrusion inclined surface 20a is smaller than the large protrusion 120L and larger than the small protrusion 120S as the first protrusions 20 provided in the outside intermediate blocks 16D.

In addition, there exist a large shoulder lateral groove 114HL in which the groove width of the shoulder opening 14H1 is larger, a small shoulder lateral groove 114HS in which the groove width of the shoulder opening 14H1 is smaller than the large shoulder lateral groove 114HL, and a middle shoulder lateral groove 114HM in which the groove width of the shoulder opening 14H1 is smaller than the large shoulder lateral groove 114HL and larger than the small shoulder lateral groove 114HS as the first outside shoulder lateral grooves 14H provided in the outside shoulder land area 18E.

The large protrusion 120L is provided so as to overlap with the large shoulder lateral groove 114HL in the tire axial direction A, the small protrusion 120S is provided so as to overlap with the small shoulder lateral groove 114HS in the tire axial direction A, and the middle protrusion 120M is provided so as to overlap with the middle shoulder lateral groove 114HM in the tire axial direction A.

In the modification example having the above configuration, it is possible to reduce pitch noise generated during traveling of the vehicle while securing drainage performance.

REFERENCE SIGNS LIST

10: tread
12A: inside center main groove
12B: outside center main groove
12C: inside shoulder main groove
12D: outside shoulder main groove
12D1: groove bottom
14A: first center lateral groove
14B: second center lateral groove
14C: first inside intermediate lateral groove
14D: second inside intermediate lateral groove
14E: inside shoulder lateral groove
14F: first outside intermediate lateral groove
14G: second outside intermediate lateral groove
14H: first outside shoulder lateral groove
14H1: shoulder opening
14I: second outside shoulder lateral groove
16A: center block
16B: inside intermediate block 1661: side wall
16132: ground contact surface
16C: inside shoulder block
16C1: side wall
16C2: ground contact surface
16D: outside intermediate block
16D1: side wall
16D2: ground contact surface
16D3: side wall
16D4: side wall
16E: outside shoulder block
16E1: first side wall
16E2: second side wall
16E3: first shoulder inclined surface
16E4: second shoulder inclined surface
16E5: ground contact surface
16E6: side wall
18A: center land area
18B: inside intermediate land area
18C: inside shoulder land area
18D: outside intermediate land area
18E: outside shoulder land area
20: first protrusion
20a: first protrusion inclined surface
20b: tip end
20c: side wall
20d: side wall
30: step
31: step
32: step
40: second protrusion
40a: second protrusion inclined surface
40a1: ground contact surface side inclined surface
40a2: groove bottom side inclined surface
50: chamfered portion

What is claimed is:

1. A pneumatic tire comprising: on a tread,
a shoulder main groove extending in a tire circumferential direction;
an intermediate land area formed on an inner side in a tire axial direction of the shoulder main groove; and
a shoulder land area formed on an outer side in the tire axial direction of the shoulder main groove,
wherein the intermediate land area includes a plurality of intermediate blocks provided to be aligned in the tire circumferential direction, first intermediate lateral grooves provided between the intermediate blocks, and a plurality of first protrusions protruding from side walls of the intermediate blocks facing the shoulder main groove to the inside of the shoulder main groove,
the shoulder land area includes a plurality of shoulder blocks provided to be aligned in the tire circumferential direction, and shoulder lateral grooves provided between the shoulder blocks,
each of the shoulder lateral grooves has a shoulder opening that opens to the shoulder main groove,
each of the first protrusions includes a first protrusion inclined surface connected to a ground contact surface of a respective one of the intermediate blocks,
the first protrusion inclined surface is inclined so that a protruding height from a groove bottom of the shoulder main groove becomes smaller as going to a tip end of a respective one of the first protrusions,
at least part of the tip end overlaps with the shoulder opening in the tire axial direction,
each of the shoulder blocks has a first side wall and a second side wall facing respective ones of the shoulder lateral grooves, a first shoulder inclined surface provided on the first side wall and is inclined so that a groove width of the respective one of the shoulder lateral grooves is widened as coming close to the shoulder main groove, and a second shoulder inclined surface provided on the second side wall and is inclined so that the groove width of the respective one of the shoulder lateral grooves is widened as coming close to the shoulder main groove,
the intermediate land area has second intermediate lateral grooves provided alternately with the first intermediate lateral grooves in the tire circumferential direction, in which one end thereof opens to the shoulder main groove and the other end terminates in the intermediate block,
the first intermediate lateral grooves and the second intermediate lateral grooves are inclined in opposite directions to each other with respect to the tire axial direction, and
the first shoulder inclined surface is provided in parallel to an extended direction of a respective one of the first intermediate lateral grooves, and the second shoulder inclined surface is provided in parallel to an extended direction of a respective one of the second intermediate lateral grooves.

2. The pneumatic tire according to claim 1,
wherein the shoulder lateral grooves extend straight, and
a center in the tire circumferential direction of the tip end of each of the first protrusions overlaps with a center in the tire circumferential direction of the shoulder opening in an extended direction of the respective one of the shoulder lateral grooves.

3. The pneumatic tire according to claim 1,
wherein the first protrusion inclined surface forms a trapezoidal shape in which a length in the tire circumferential direction becomes shorter as going to a tip end side, and
a length in the tire circumferential direction of the tip end of each of the first protrusions is shorter than a length in the tire circumferential direction of the respective shoulder opening.

4. The pneumatic tire according to claim 1, wherein the first protrusions include large protrusions and small protrusions,
an area of the first protrusion inclined surface of each of the small protrusions is smaller than that of each of the large protrusions,
the shoulder lateral grooves include large shoulder lateral grooves and small shoulder lateral grooves having a narrower groove width than the large shoulder lateral grooves, and
each of the large protrusions overlaps respectively with each of the large shoulder lateral grooves in the tire axial direction, and each of the small protrusions overlaps with each of the small shoulder lateral grooves in the tire axial direction.

5. The pneumatic tire according to claim 1,
wherein the shoulder opening is provided on an extension of the first intermediate lateral groove.

6. A pneumatic tire comprising: on a tread,
a shoulder main groove extending in a tire circumferential direction;
an intermediate land area formed on an inner side in a tire axial direction of the shoulder main groove; and
a shoulder land area formed on an outer side in the tire axial direction of the shoulder main groove, wherein the intermediate land area includes a plurality of intermediate blocks provided to be aligned in the tire circumferential direction, first intermediate lateral grooves provided between the intermediate blocks, and a plurality of first protrusions protruding from side walls of the intermediate blocks facing the shoulder main groove to the inside of the shoulder main groove, the shoulder land area includes a plurality of shoulder blocks provided to be aligned in the tire circumferential direction, and shoulder lateral grooves provided between the shoulder blocks, each of the shoulder lateral grooves has a shoulder opening that opens to the shoulder main groove, each of the first protrusions includes a first protrusion inclined surface connected to a ground contact surface of a respective one of the intermediate blocks, the first protrusion inclined surface is inclined so that a protruding height from a groove bottom of the shoulder main groove becomes smaller as going to a tip end of a respective one of the first protrusions, at least part of the tip end overlaps with the shoulder opening in the tire axial direction, each of the shoulder blocks has a first side wall facing a respective one of the shoulder lateral grooves on a kicking side of the respective shoulder block, a second side wall facing a respective one of the shoulder lateral grooves on a stepping side of the respective shoulder block, a first shoulder inclined surface provided on the first side wall and is inclined so that a groove width of the respective one of the shoulder lateral grooves is widened as coming close to the shoulder main groove, and a second shoulder inclined surface provided on the second side wall and is inclined so that the groove width of the respective one of the shoulder lateral grooves is widened as coming close to the shoulder main groove, and the first shoulder inclined surface is wider than the second shoulder inclined surface.

7. A pneumatic tire comprising: on a tread, a shoulder main groove extending in a tire circumferential direction;

an intermediate land area formed on an inner side in a tire axial direction of the shoulder main groove; and a shoulder land area formed on an outer side in the tire axial direction of the shoulder main groove, wherein the intermediate land area includes a plurality of intermediate blocks provided to be aligned in the tire circumferential direction, first intermediate lateral grooves provided between the intermediate blocks, and a plurality of first protrusions protruding from side walls of the intermediate blocks facing the shoulder main groove to the inside of the shoulder main groove, the shoulder land area includes a plurality of shoulder blocks provided to be aligned in the tire circumferential direction, and shoulder lateral grooves provided between the shoulder blocks, each of the shoulder lateral grooves has a shoulder opening that opens to the shoulder main groove, each of the first protrusions includes a first protrusion inclined surface connected to a ground contact surface of a respective one of the intermediate blocks, the first protrusion inclined surface is inclined so that a protruding height from a groove bottom of the shoulder main groove becomes smaller as going to a tip end of a respective one of the first protrusions, at least part of the tip end overlaps with the shoulder opening in the tire axial direction, the intermediate land area has second protrusions provided alternately with the first protrusions in the tire circumferential direction, each of the second protrusions has a second protrusion inclined surface connected to the ground contact surface of a respective one of the intermediate blocks, the second protrusion inclined surface is inclined so that a protruding height from the groove bottom becomes smaller as going to a tip end side, and a protruding amount from the side wall facing the shoulder main groove to the shoulder main groove is smaller than a protruding amount of each of the first protrusions, and each of the shoulder blocks is provided with a chamfered portion at a position facing a respective one of the second protrusions with the shoulder main groove interposed therebetween.

* * * * *